UNITED STATES PATENT OFFICE.

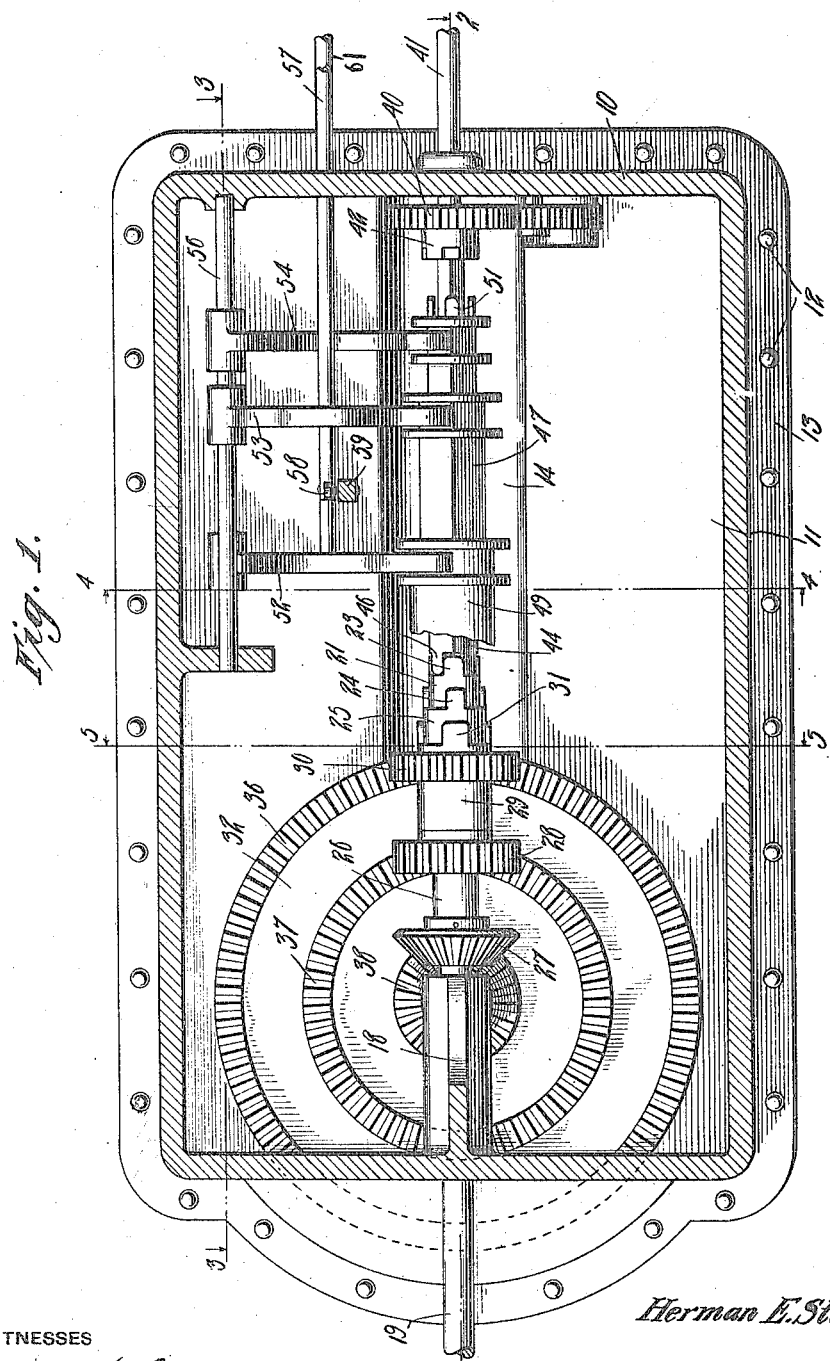

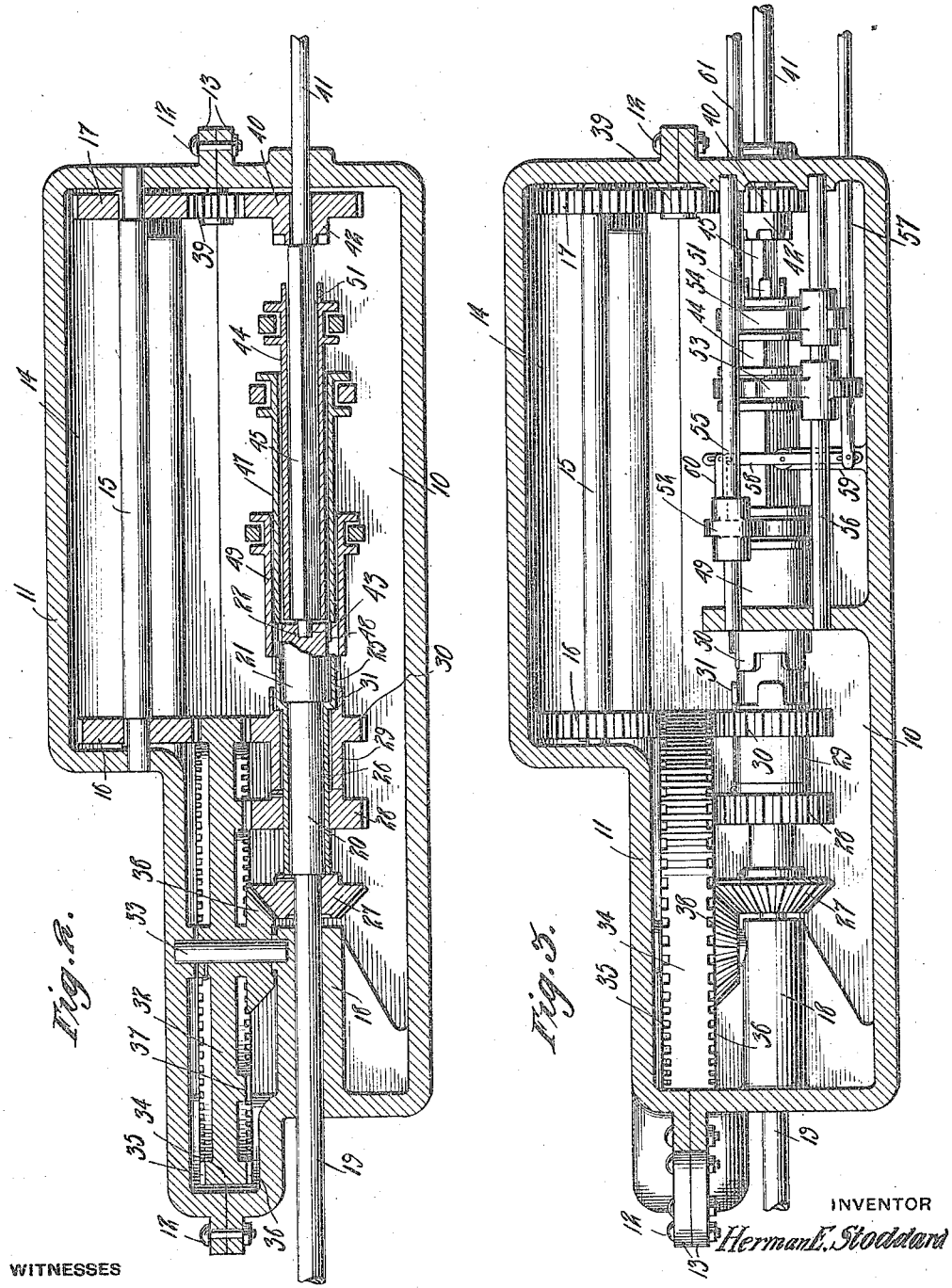

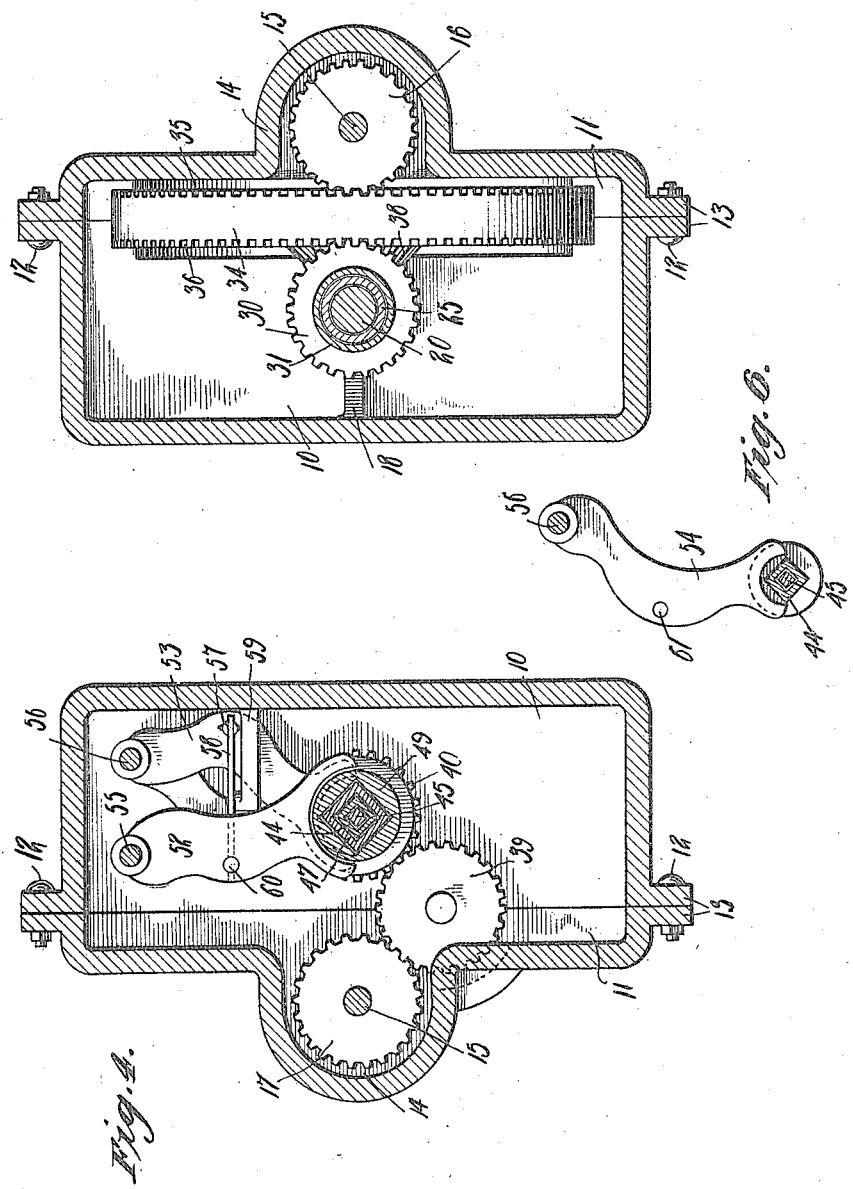

HERMAN E. STODDARD, OF SPRINGFIELD, MASSACHUSETTS.

TRANSMISSION MECHANISM.

1,257,760.

Specification of Letters Patent.   Patented Feb. 26, 1918.

Application filed June 8, 1916.   Serial No. 102,525.

*To all whom it may concern:*

Be it known that I, HERMAN E. STODDARD, a citizen of the United States, residing at Springfield, in the county of Hampden and State of Massachusetts, have invented certain new and useful Improvements in Transmission Mechanism, of which the following is a specification.

This invention relates to an improved transmission mechanism for an automobile and the principal object of the invention is to provide improved means for transmitting rotary movement from the driving shaft to the driven shaft, means being provided for indirect and direct transmission of the rotary movement thus permitting the driven shaft to be rotated either at the same or at a different rate of speed from the driving shaft.

Another object of the invention is to provide improved clutch means for selectively causing the driven shaft to rotate either in the same direction or in an opposite direction to the drive shaft.

Another object of the invention is to provide improved means for actuating the clutches forming part of the transmission.

Another object of the invention is to provide an improved type of clutch, the clutches being so constructed and actuated that one clutch sleeve may serve for the reversing and for the slow speed and second clutch sleeve provided for the second and high speed, the second sleeve being moved out of an operative position when the high speed is moved into an operative position.

This invention is illustrated in the accompanying drawings, wherein:—

Figure 1 is a view showing the transmission casing in longitudinal section and the clutch mechanism in elevation.

Fig. 2 is a longitudinal sectional view taken along the line 2—2 of Fig. 1.

Fig. 3 is a longitudinal sectional view taken along the line 3—3 of Fig. 1.

Fig. 4 is a vertical sectional view taken along the line 4—4 of Fig. 1.

Fig. 5 is a vertical sectional view taken along the line 5—5 of Fig. 1.

Fig. 6 is a fragmentary view of the clutch sleeve actuating mechanism.

The casing 10 is provided with a cap or closure 11 which is secured to the casing 10 by means of the bolts 12 passing through the flanges 13 of the cap and casing. Therefore the cap can be removed when desired to repair or examine any of the parts of the transmission.

This cap has one end portion provided with the extension forming a chamber 14 through which there extends a shaft 15 having the gears 16 and 17 rigidly mounted upon its end portion. It will thus be seen that when the cap is removed, the shaft together with gears 16 and 17 will be carried with the cap.

Within the casing there is provided at one end a bearing 18 through which there extends the driving shaft 19, the driving shaft having its end portion thickened to provide a neck 20 and head 21. This head 21 is provided with a socket 22 and a clutch piece 23 which are constructed similar to the clutch teeth 24 positioned at the ends of the heads 25 of the sleeve 26. The sleeve 26 is rotatably mounted upon the neck 20 of the drive shaft and is held against longitudinal movement by means of the beveled gear 27 rigidly mounted upon the driving shaft. A gear 28 is rigidly mounted upon the sleeve 26 intermediate its length and serves to prevent longitudinal movement of the sleeve 29 which in its turn carries a gear 30 and is provided with clutch 31 similar to the teeth 23 and 24. It will thus be seen that the sleeves 26 and 29 can be rotated freely and at different rates of speed from the drive shaft.

A large disk or gear plate 32 is rotatably mounted by means of the axle or pin 33 and is provided with a rim 34 having gear teeth 35 and 36. This disk is provided with the gear teeth 37 and with a bevel gear 38 which meshes with the beveled gear 27 of the driving shaft 19. Therefore when the driving shaft is rotating, the gear plate 32 will also be rotated and as the gears 36 and 37 mesh with the teeth of the gears 28 and 30, the sleeves 26 and 29 will be rotated. The gear 16 meshes with the teeth 35 and rotary motion will thus be transmitted to the shaft 15, when the driving shaft is rotating. The gear 17 meshes with an idler gear 39 positioned in the casing and this gear 39 meshes with the gear 40 rotatably mounted upon the driven shaft 41, and provided with a clutch collar 42 having teeth similar to the teeth of the clutches 23, 24 and 25. By means of this arrangement of gears, the sleeves 26 and 29 will rotate in the same direction that the driving shaft 19 rotates whereas the gear 40 will rotate in the opposite direction, this being provided so that the gear 40 may constitute a reverse clutch.

The inner end portion of the driven shaft 41 is reduced to provide a pin 43 fitting into the socket 22 and between this pivot pin 43 and the reversing clutch gear 40, the driven shaft is squared in cross section so that the clutch sleeve 44 which is mounted upon this squared portion 45 of the driven shaft may slide upon the driven shaft but will be held against rotation thereon. This clutch sleeve 44 is provided with clutch teeth 46 to engage the clutch teeth of the head 23 and is squared as shown in Fig. 4 so that the clutch sleeve 47 which is slidably mounted upon the clutch sleeve 44 will be held against rotation. Clutch teeth 48 are provided upon one of the clutch sleeves 47 and upon this clutch sleeve 47 which is for the second speed there is slidably mounted a clutch sleeve 49 for the high speed, the clutch sleeve 49 being provided with clutch teeth 50 for engaging the clutch teeth 31. Upon the opposite end of the clutch sleeve 44 which is for low speed and reversing there is provided clutch teeth 51 for engagement with the teeth of the clutch 42. It will thus be seen that by movement of the clutch sleeves 44, 47 and 49, the direction and speed of rotation of the driven shaft 41 can be controlled. If the clutch sleeve 44 is moved to bring the teeth 51 into engagement with the clutch element 42, the rotation to the driven shaft will be through the gears 27 to the gear 32 and from this gear disk 32 to the shaft 15 through the medium of the gear 16 and from the shaft 15 to the clutch gear 40 through the medium of the gears 17 and 39. This gear 40 rotates in the opposite direction to the driving shaft and therefore when the clutch sleeve 44 is engaged by the clutch gear 40, the driven shaft will be rotated to move the automobile rearwardly. By moving the clutch sleeve toward the driving shaft, the clutch teeth 51 will be moved out of engagement with the clutch gear and into engagement with the clutch teeth 23, thus causing the driven shaft to be directly connected with the driving shaft. The automobile will now move forwardly slowly or at the first or slow rate of speed. After the automobile has started, or if it is desired to increase the speed, the clutch sleeve 44 can be moved out of engagement with the clutch head 21 and the clutch sleeve 47 which is for the second speed, can be moved to bring its clutch teeth into engagement with the teeth of the clutch head 25 and sleeve 26. The rotary movement will now be transmitted from the gear plate 32 to the sleeve 26 through the medium of gear 28 and to the driven shaft through the medium of the clutch sleeve 47 and the speed of the automobile will thus be increased to the second speed. If it is desired to travel at the high rate of speed, the clutch sleeve 47 can be moved to the inoperative position and the clutch sleeve 49 moved to bring its teeth into engagement with the clutch teeth 31 of the sleeve 29. The rotary movement will now be transmitted to the driven shaft through the medium of this sleeve 29 which engages the clutch sleeve 49 and has its gear 30 engaging the teeth 36 of the gear plate 32 and the machine will then travel at the high rate of speed. It will thus be seen that the automobile can be easily shifted from high to second or from second to low and can also be easily shifted from low to reverse or from reverse to low speed.

In order to shift these clutch sleeves there has been provided shifting arms 52, 53 and 54, the arm 52 being slidably mounted upon a rod 55 and the arms 53 and 54 being slidably mounted upon a rod 56. A draw-rod 57 which can be actuated by any suitable mechanism, is connected with the arm 53 and with the lever 58 pivotally mounted upon the standard 59 and it will thus be seen that when the draw rod 57 is moved to bring the clutch sleeve 47 into engagement with the teeth of the clutch head 25, the clutch sleeve 49 will be moved toward inoperative position through the medium of the link 60 which connects the arm 52 with the lever 58. A separate draw rod 61 is provided for the arm 54 as it is desired to have this arm 54 moved independent of the arms 52 and 53. Therefore the clutch can be first shifted to back the machine away from the curb and then moved to the forward position thus permitting the automobile to move forwardly slowly and after the machine has gained momentum, the sleeve 44 can be moved to the inoperative position and the draw rod 57 then moved to shift the sleeves 47 and 49 from a neutral position to an extended position thus bringing the sleeve 47 into the operative position and the sleeve 49 to the inoperative position. Upon movement of the rods in the opposite directions, the relative positions of the sleeves 47 and 49 will be changed and the sleeve 49 brought into the operative position so that the automobile will travel at high speed instead of second speed.

I have thus provided a transmission mechanism which is easy to operate and which is further so constructed that there will be no danger of the gears being stripped as the gears are always in mesh. I have further provided a transmission mechanism so constructed that a quick shift can be made from high to second or from second to high speed as these clutch sleeves move simultaneously and therefore while one is moving from an inoperative to an operative position, the second will be moving from the operative to the inoperative position. If it is desired to repair or clean the clutch, the clutch can be easily removed by withdrawing securing bolt 12 and when removed will carry with it the shaft 15 and release the pivot pin or axle 33 thus permitting the gear disk or plate 32 to be removed from the housing or casing.

What is claimed is:—

1. A transmission mechanism comprising a casing, a driving shaft extending into said casing, a driven shaft extending into said casing and rotatably engaging the inner end portion of the driving shaft, a clutch gear loosely mounted upon said driven shaft, the inner end portion of said driving shaft being provided with a clutch head, a clutch sleeve slidably mounted upon the inner end portion of said driven shaft and held against rotation thereon and having its end portions provided with clutch teeth for engaging the clutch head and clutch gear when the clutch sleeve is longitudinally adjusted upon the driven shaft, a gear plate rotatably mounted in said casing, and having a plurality of circular rows of gear teeth, a gear carried by said driving shaft for transmitting rotary movement of the driving shaft to the gear plate, a sleeve rotatably mounted upon the inner end portion of said driving shaft and provided with a gear meshing with a row of teeth of said gear plate and having its inner end portion provided with a clutch head, a clutch sleeve slidably mounted upon the first mentioned clutch sleeve and provided with clutch teeth for engaging the clutch head of the sleeve mounted upon said driving shaft, a sleeve rotatably mounted upon the sleeve of said driving shaft and provided with a gear engaging the other row of teeth formed upon said gear plate and provided with clutch teeth, a clutch sleeve slidably mounted upon said last mentioned clutch sleeve and provided with teeth for engaging the last mentioned clutch teeth, means for moving said clutch sleeve into and out of an operative position, a shaft rotatably mounted in said casing and provided with gear wheels, one of the gear wheels engaging another row of teeth formed upon said gear plate, and a gear wheel in said casing meshing with the teeth of the second gear wheel of the last mentioned shaft and with the teeth of the clutch gear.

2. A transmission mechanism comprising a housing, a driving shaft extending into said housing, a driven shaft extending into said housing, a reversing clutch gear rotatably mounted upon said driven shaft, the inner end portion of said driving shaft being provided with a low speed clutch head, a reversing and low speed clutch sleeve slidably mounted upon said driven shaft between the low speed head and the reversing clutch gear and provided with teeth for engagement with the teeth of the clutch head and clutch gear, a gear plate rotatably mounted in said casing and rotated from said driving shaft, a second clutch sleeve rotatably mounted upon said driving shaft and rotated from said gear plate, a second speed clutch sleeve slidably mounted upon the reversing and low speed clutch sleeve and provided with teeth for engaging the teeth of the second speed clutch sleeve of said driving shaft, means for transmitting rotary movement from the gear plate to the reversing clutch gear, a gear sleeve rotatably mounted upon the second speed clutch sleeve of said driving shaft, and a high speed clutch sleeve slidably mounted upon the second speed clutch sleeve of said driving shaft and provided with teeth for engaging the teeth of the high speed clutch sleeve of said driving shaft.

3. A transmission mechanism comprising a housing, a driving shaft extending into said housing, a driven shaft extending into said housing, a clutch element rotatably mounted upon said driven shaft, means for transmitting rotary movement from said driving shaft to said clutch element to rotate the clutch element in an opposite direction to the rotation of said driving shaft, means for selectively connecting said driven shaft with said clutch element and with said driving shaft for changing the direction of rotation of said driven shaft, and means associated with the first mentioned means for transmitting rotary movement from the driving shaft to the driven shaft to rotate the driven shaft at a different rate of speed from said driving shaft.

4. A transmission mechanism comprising a housing, a driving shaft extending into said housing, a driven shaft extending into said housing, a gear plate rotatably mounted in said housing, and rotated from said driving shaft, a clutch element rotatably mounted upon said driven shaft, means for transmitting rotary movement from said gear plate to said clutch element, a clutch element rotatably mounted upon said driving shaft and rotating from said gear plate, said driving shaft being provided with a clutch element at its inner end, a clutch element slidably mounted upon said driven shaft for engagement with the clutch element of the driven shaft and the clutch element of the driving shaft, and a clutch element slidably mounted upon the last mentioned clutch element for engagement with the clutch element rotatably mounted upon the driving shaft.

5. A transmission mechanism comprising a casing, a driving shaft extending into said casing, a driven shaft extending into said casing, a reversing clutch element rotatably mounted upon said driven shaft, means for transmitting rotary movement from said driving shaft to said clutch element including a gear plate rotated from the driving shaft, said driving shaft being provided with a clutch head at its inner end, a reversing or low speed clutch element slidably mounted upon said driven shaft for operative connection with the reversing clutch element and with the clutch head of said driving shaft, a second speed clutch element rotatably mounted upon said driving shaft and rotated from the gear plate, a high speed clutch element rotatably mounted upon the second speed clutch element of said driving shaft and rotated from the gear plate, a second speed clutch element slidably mounted upon the low speed clutch element of the driven shaft, a high speed clutch element slidably mounted upon the second speed clutch element of the driven shaft, and means for simultaneously sliding the second and high speed clutch elements of said driven shaft to move one toward an operative position while the second is moving toward an inoperative position.

6. A transmission mechanism comprising a casing, a driving shaft extending into said casing, a driven shaft extending into said casing, a clutch element rotatably mounted upon said driving shaft, a clutch element rotatably mounted upon the first mentioned clutch element of said driving shaft, means for transmitting rotary movement from said driving shaft to said clutch element including a gear plate engaging the clutch element, a clutch element slidably mounted upon the driven shaft, a second clutch element slidably mounted upon the first mentioned clutch element of said driven shaft, and means for simultaneously moving the clutch element of said driven shaft in opposite directions to move one into operative relation to the corresponding clutch sleeve of the driving shaft when the second clutch sleeve of the driven shaft is moving to an inoperative position.

7. A transmission mechanism comprising a casing, a driving shaft extending into said casing, a driven shaft extending into said casing, clutch elements rotatably carried by said driving shaft and positioned one within the other, means for transmitting rotary movement from said driving shaft to said clutch element, telescoping clutch elements slidably mounted upon said driven shaft, guide rods mounted in said casing, shifting arms slidably mounted upon said guide rods and engaging the sliding clutch elements of said driven shaft, a rocker lever pivotally mounted in said casing and connected with one of the shifting arms, and an actuating rod for said lever connected with the second shifting arm whereby movement of said actuating rod will move one of the clutch elements of said driven shaft into operative engagement with the corresponding rotary clutch element of said driving shaft and through the medium of said lever move the second sliding clutch element of the driven shaft out of an operative position with respect to its corresponding rotary clutch element of the driving shaft.

In testimony whereof I affix my signature in presence of two witnesses.

HERMAN E. STODDARD.

Witnesses:
W. H. STOCKWELL,
JAMES L. BOWEN.

Copies of this patent may be obtained for five cents each, by addressing the "Commissioner of Patents, Washington, D. C."